United States Patent Office 3,752,677
Patented Aug. 14, 1973

3,752,677
GREEN PEA SOUP MIX AND METHOD FOR
MAKING THE SAME
Holt Andrews, Demarest, and Sirvart K. Bedrosian, Westwood, N.J., assignors to Thomas J. Lipton, Inc., Englewood Cliffs, N.J.
No Drawing. Filed Aug. 19, 1971, Ser. No. 173,322
Int. Cl. A23l 1/40
U.S. Cl. 99—124                    4 Claims

ABSTRACT OF THE DISCLOSURE

A dry green pea soup mix of improved flavor and color stability and reconstitutable in less than one minute by the addition of boiling water is disclosed. The preferred mix comprises an agglomerated blend of, by weight, about 72% green pea flakes, about 12% corn syrup solids, about 5.5% green pea powder, about 4.5% spice mix, about 3.0% smoked yeast, about 1.5% starch and about 0.5% each of sugar, monosodium glutamate, and vegetable protein.

The green pea flakes are formed by cooking green split peas in aqueous slurry and by addition of vegetable oil and starch. The slurry is dried and is broken into flakes which are blended with green pea powder, corn syrup solids, flavoring and the balance of the ingredients while maintaining the integrity of the flakes. The blend is then agglomerated, dried and sized through a screen.

---

The present invention relates to a dry green pea soup mix of improved flavor and color stability that is readily rehydratable on addition of boiling water within one minute to provide a pea soup, and to the method of making the mix.

Dry pea soup mixes have been available in the market place for some time, and some are rehydratable to a ready-to-eat soup with the simple addition of boiling water, Representative patents that disclose such pea soup mixes are United States Pats. Nos. 2,079,649, 2,141,364, 2,391,829, 2,657,999 and 3,433,650. Conventional mixes generally use finely milled pea meal as the sole pea solids component of the mix. The pea soup mixes of the prior art, however, have the disadvantages of losing the typical green coloration desired in green pea soup mixes. The desirable green coloration bleaches to a bronze or yellow color. In addition, the flavor deteriorates during storage of the dry mix and within a relatively short time takes on an unpleasant oxidized character. It is therefore desirable to provide a green pea soup mix of improved color and flavor stability during storage.

DESCRIPTION OF THE INVENTION

It has now been found that a pea soup mix which is rehydratable within less than one minute upon the addition of boiling water and which is, at the same time, stable to color and flavor changes during storage over periods as long as a year is provided by first preparing the bulk of the green pea solids to be used in the mix as green pea flakes and by thereafter mixing these flakes with a small portion of green pea solids, corn syrup solids and other flavoring ingredients to form a blend. The blend of ingredients is then moistened, agglomerated and dried to form the pea soup mix of the present invention.

The first step in forming the green pea soup mix of the present invention is the preparation of the green pea flakes. Washed green split peas, which are dehydrated peas containing only the cotyledons with the seed coat removed, are cooked with approximately three times their weight in boiling water, preferably together with salt, potassium carbonate and locust bean gum. After cooking for about 20 minutes, approximately 4% by weight of the split peas of hydrogenated cotton seed oil or other suitable hydrogenated vegetable oil is added, together with a flavoring mixture and a cold water slurry of raw potato starch. The starch is added at a level of about 4% in an amount of water equal to about ¼ of the weight of the pea solids present. After cooking for an additional 10 minutes, the slurry is pumped to a drum dryer where it is dried, preferably at 70 lbs. p.s.i. steam pressure, with a roll speed of 3 r.p.m. It is preferred that the slurry be dried to provide flakes having an average moisture content of about 5.5%.

The green pea flakes prepared above are then combined with corn syrup solids, pea powder, salt, flavoring, preferably including smoked yeast, sugar, monosodium glutamate, vegetable protein and a small amount of pregelatinized starch. The corn syrup solids, such as Malto Dextrin, are preferably employed in the range of 10 to 15% by weight of the final mix, a level of 12% being preferred. This material assists in the agglomeration process and is used to improve the stability of the mix in hot water.

The pea powder is preferably added at the level of 3 to 8%, preferably about 5% by weight of the mix. The pea powder consists of green pea solids in the form of a free-flowing powder having a maximum moisture content of about 10.5% and a maximum ash content of 3%. Approximately 99% of the particles will pass through a U.S. 30-mesh screen. One suitable material is provided by the Dumas Seed Company, Moscow, Idaho; a preferred powder is obtained from the Dumas B-87 Hybrid.

The flavorings used are those characteristic of pea soups in general and include salt, spices, artificial ham flavorings, monosodium glutamate, vegetable protein, a small amount of sugar and smoked torula yeast. A pregelatinized tapioca starch is also used in the mix at a level ranging from 1 to 2%, preferably 1.6%, to help provide the desired consistency in the final product.

The green pea flakes are combined with the other ingredients of the mix with suitable blending techniques, care being taken that the flakes remain substantially intact. After the blending operation, the mix is agglomerated. Either steam or hot water may be used to increase the moisture content of the mix sufficient to cause some degree of clumping. After this has taken place, the mix is dried to its former moisture content, i.e. 3 to 4%, and the clumps are broken up. Preferably the mix is passed through a 12-mesh screen to provide a coarse sandy powder. In one preferred agglomeration procedure, the mixture is airveyed through a stainless steel tube, where it is continuously mixed with wet steam to raise the moisture content to 11-12%. The corn syrup solids become sticky at this moisture level and cause particles to lump together. The lumps are then dried by passing them through an enclosed vibrating conveyor with a fine mesh base allowing a stream of heated air (180-190° F.) to pass through the material drying it to a moisture content of 3-4%. The lumps are then sifted through a 12-mesh screen.

The invention is further described by the following example.

Example I

Green pea flake was prepared from green split peas. One thousand pounds of washed U.S. No. 1 green split peas were added to a cooking kettle, containing 2,750 lbs. of boiling water, 28 lbs. of salt, 2 lbs. of locust bean gum and 2 lbs. of potassium carbonate. This mixture was boiled for 20 minutes. Thirty-nine pounds of hydrogenated cotton seed oil was then added, and after 10 additional minutes of boiling, a warm water extract of a spice mixture comprising 340 g. of cloves, 241 g. of thyme and 100 g. of bay leaves were added together with a cold water slurry comprising 37 lbs. of raw potato starch in 250 lbs. of water. After the ingredients were thoroughly mixed, the slurry was pumped to drum dryers and dried at 70 p.s.i. steam pressure with a roll speed of 3 r.p.m. The material was dried to an average moisture content of 5.5%.

The dry material leaving the drying drum was collected and passed through a flaker screen having ⅜" openings. The composition of the green pea flakes obtained as a result of this process was as follows:

| | Percent |
|---|---|
| Green pea solids | 84.76 |
| Hydrogenated cottonseed oil | 3.75 |
| Potato starch | 2.96 |
| Salt | 2.70 |
| Locust bean gum | .17 |
| Potassium carbonate | .16 |
| Clove | Trace |
| Thyme | Trace |
| Bay leaves | Trace |
| Moisture | 5.50 |

A dry blend of the green pea flake is then made with the other ingredients of the mix in accordance with the following formula:

| Ingredients: | Percent by weight |
|---|---|
| Pea flakes | 72.0 |
| Corn syrup solids | 12.0 |
| Pea powder [1] | 5.5 |
| Spice, salt and other flavorings | 4.5 |
| Smoked torula yeast | 3.0 |
| Pregelatinized tapioca starch | 1.5 |
| Sugar | 0.5 |
| Monosodium glutamate | 0.5 |
| Vegetable protein hydrol, 4 BE | 0.5 |

[1] Green pea solids in the form of a free-flowing powder having a maximum moisture content of about 10.5% and a maximum ash content of 3.0%. Approximately 99% of the particles are small enough to pass through a U.S. No. 30-mesh screen. The powder was from the B-87 Hydrid line of the Dumas Seed Company, Moscow, Idaho.

Thirty-five grams of the above-described mix were mixed with six fluid ounces of boiling water and are stirred for thirty seconds. A thick, flavorful, fully-cooked soup was formed which was free of lumps, hard pieces and uncooked material. In addition, the mix retained its bright green color and excellent flavor over an extended period of storage.

We claim:
1. A method of forming green pea flake for use in dry soup mixes which comprises
   (a) cooking green split peas in approximately three times their weight of boiling water in the presence of about 3% salt, about .2% of locust bean gum and about .2% of potassium carbonate for about 20 minutes,
   (b) adding about 4% of hydrogenated cotton seed oil to the cooked mixture, together with flavoring and a cold water slurry comprising about 25% of water and 4% of raw potato starch, said percentages being by weight of pea solids present,
   (c) boiling the mixture for about an additional 10 minutes to form an aqueous slurry, and
   (d) drum drying the aqueous slurry to provide thin flakes having an average moisture content of about 5.5%.

2. The method of making a green pea soup mix which comprises
   (a) preparing green pea flakes in accordance with the method of claim 1,
   (b) dry-blending the flakes with the ingredients and in the proportions indicated in the following formula:

| Ingredients: | Percent by weight |
|---|---|
| Pea flakes | 72.0 |
| Corn syrup solids | 12.0 |
| Pea powder | 5.5 |
| Flavoring | 4.5 |
| Smoked yeast | 3.0 |
| Pregelatinized tapioca starch | 1.5 |
| Sugar | 0.5 |
| Monosodium glutamate | 0.5 |
| Vegetable protein | 0.5 |
| | 100.0 |

(c) agglomerating the mixture by raising the moisture content with steam to 11-12%,
   (d) redrying the mixture to 3-4% moisture, and
   (e) passing the mixture through a 12-mesh screen to obtain a coarse sandy powder.

3. The product of the process of claim 2.

4. The method of making a green pea soup mix which comprises
   (a) preparing green pea flake by
      (1) cooking green split peas in boiling water until the peas are gelatinized
      (2) adding hydrogenated vegetable oil to an aqueous slurry on the cooked pea solids, together with flavoring and a cold water slurry of potato starch, and
      (3) drying the aqueous slurry in a thin film under starch-gelatinizing conditions to form pea flakes having an average moisture content of about 5.5%;
   (b) dry-blending the pea flakes with pea powder, corn syrup solids, pregelatinized starch and flavoring ingredients,
   (c) agglomerating the blend with the addition of moisture, and
   (d) drying the mixture to form a stable pea soup mix.

References Cited

UNITED STATES PATENTS

| 625,880 | 5/1899 | Geie | 99—124 |
| 1,813,268 | 7/1931 | Bachler. | |
| 2,343,149 | 2/1944 | Krause | 99—204 R |
| 2,630,391 | 3/1953 | Templeton. | |
| 2,657,999 | 11/1953 | Rauch | 99—124 X |
| 3,433,650 | 3/1969 | Block | 99—124 |

FOREIGN PATENTS

| 71,478 | 7/1959 | France. |
| 845,937 | 8/1960 | Great Britain. |

FRANK W. LUTTER, Primary Examiner

R. HALPER, Assistant Examiner

U.S. Cl. X.R.

99—204

PO-1050
(5/69)

UNITED STATES PATENT OFFICE
CERTIFICATE OF CORRECTION

Patent No. 3,752,677            Dated August 14, 1973

Inventor(s) Holt Andrews and Sirvart K. Bedrosian

It is certified that error appears in the above-identified patent and that said Letters Patent are hereby corrected as shown below:

Col. 1, line 37 "water," should be --water.--;

Col. 1, line 60 "portion" should be --proportion--;

Col. 4, line 33 (claim 4), "on" should be --of--;

Col. 4, lines 51 and 53, insert --99-204 UXA-- and --99-204 UX-- for the class and subclass of Bachler and Templeton patents, respectively.

Signed and sealed this 19th day of February 1974.

(SEAL)
Attest:

EDWARD M. FLETCHER, JR.        C. MARSHALL DANN
Attesting Officer                 Commissioner of Patents